US008265783B2

(12) United States Patent
Saito

(10) Patent No.: US 8,265,783 B2
(45) Date of Patent: Sep. 11, 2012

(54) METHOD FOR CREATING PROFILE DATA USED TO PROCESS NON-CIRCULAR WORKPIECE

(75) Inventor: Akira Saito, Obu (JP)

(73) Assignee: JTEKT Corporation, Osaka-shi (JP)

( * ) Notice: Subject to any disclaimer, the term of this patent is extended or adjusted under 35 U.S.C. 154(b) by 623 days.

(21) Appl. No.: 12/471,943

(22) Filed: May 26, 2009

(65) Prior Publication Data

US 2009/0292380 A1    Nov. 26, 2009

(30) Foreign Application Priority Data

May 26, 2008    (JP) .................................. 2008-136527

(51) Int. Cl.
*G06F 19/00*    (2011.01)
(52) U.S. Cl. ........ 700/193; 700/187; 700/189; 318/571; 318/573
(58) Field of Classification Search .................. 700/186, 700/187, 189, 193; 318/571, 573
See application file for complete search history.

(56) References Cited

U.S. PATENT DOCUMENTS

| | | | | |
|---|---|---|---|---|
| 4,963,805 A * | 10/1990 | Suzuki et al. | ................. | 318/569 |
| 5,031,107 A * | 7/1991 | Suzuki et al. | ................. | 700/186 |
| 5,418,731 A * | 5/1995 | Yoshimura et al. | ........... | 700/189 |
| 5,723,961 A * | 3/1998 | Fujino et al. | ............. | 318/568.15 |
| 5,746,643 A | 5/1998 | Terasaki et al. | | |
| 6,721,622 B2 * | 4/2004 | Inagaki et al. | ................. | 700/193 |
| 2003/0114954 A1 * | 6/2003 | Inagaki et al. | ................. | 700/193 |

FOREIGN PATENT DOCUMENTS

| | | |
|---|---|---|
| EP | 0 329 080 | 8/1989 |
| JP | 1-206406 | 8/1989 |
| JP | 9-160623 | 6/1997 |

OTHER PUBLICATIONS

Extended Search Report issued Dec. 19, 2011 in European Patent Application No. 09161007.1-1239.

* cited by examiner

*Primary Examiner* — John R. Cottingham
*Assistant Examiner* — Douglas Lee
(74) *Attorney, Agent, or Firm* — Oblon, Spivak, McClelland, Maier & Neustadt, L.L.P.

(57) ABSTRACT

Lift data in which a lift amount is set based on a lift data rotation angle is read to identify the shape of a non-circular workpiece, and a profile point group that is formed of a plurality of profile points, each of which indicates a tool reciprocation position that corresponds to a spindle rotation angle, is calculated based on the read lift data. Then, the calculated profile point group is divided into a plurality of groups each of which is formed of the profile points that satisfy a group division condition, the two groups that satisfy a group comparison condition are selected, and the profile point that satisfies a specific point deletion condition that is set in advance for the combination of the selected two groups is deleted.

12 Claims, 7 Drawing Sheets

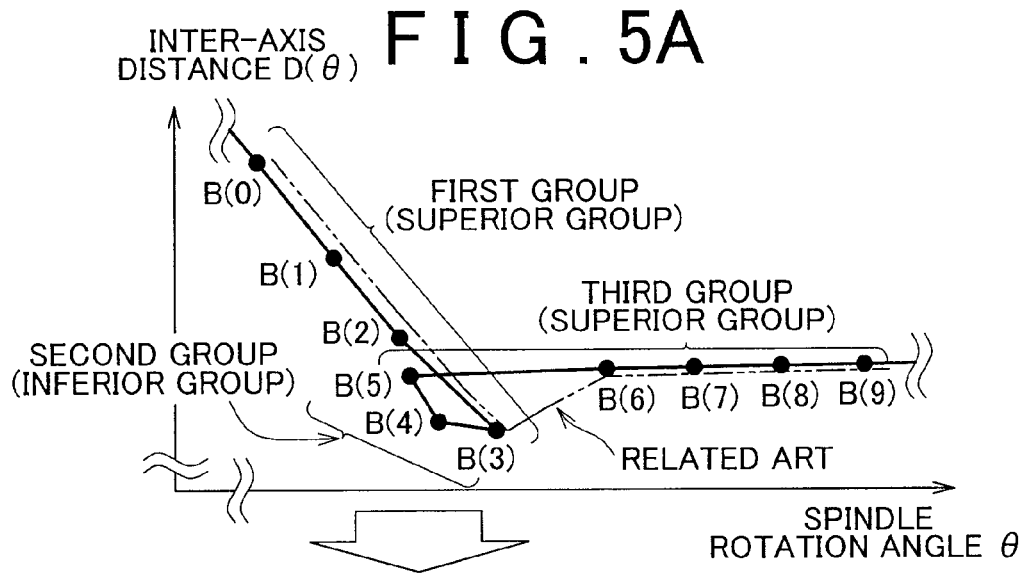
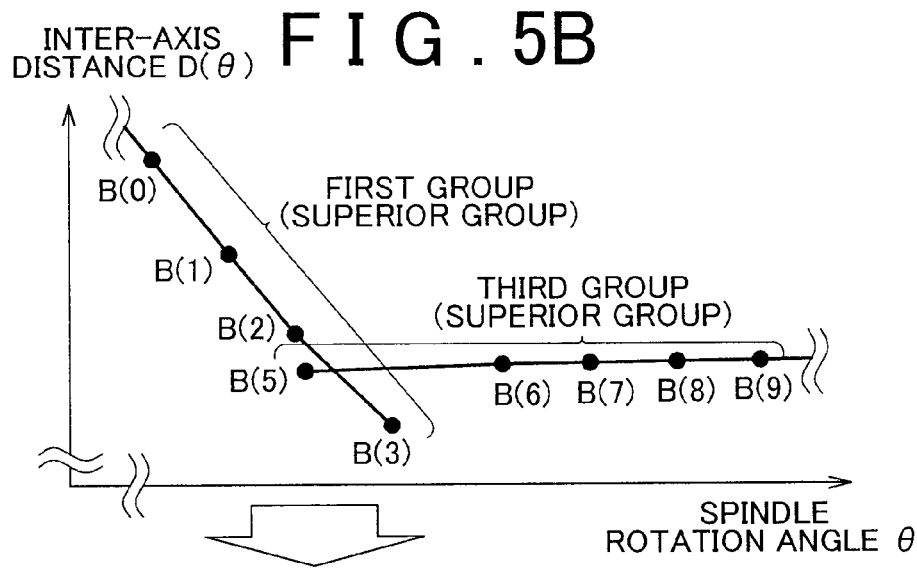
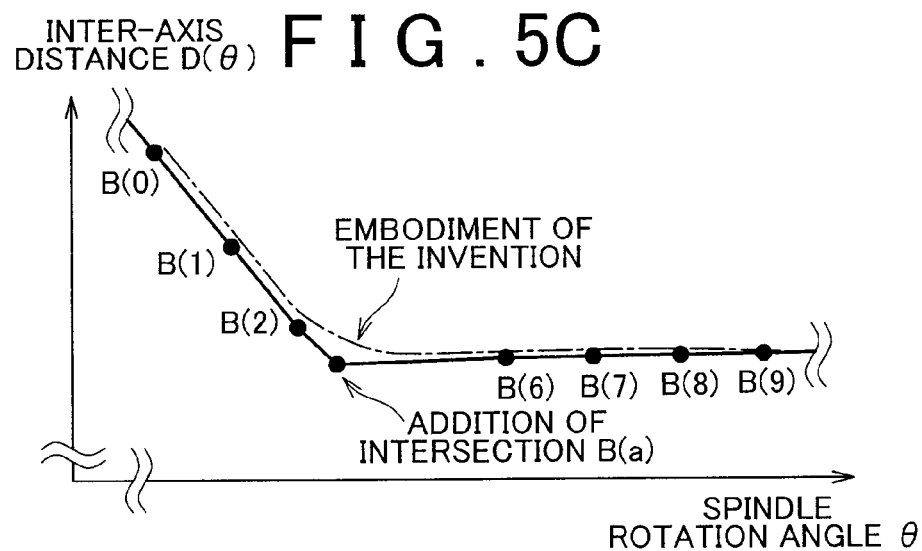

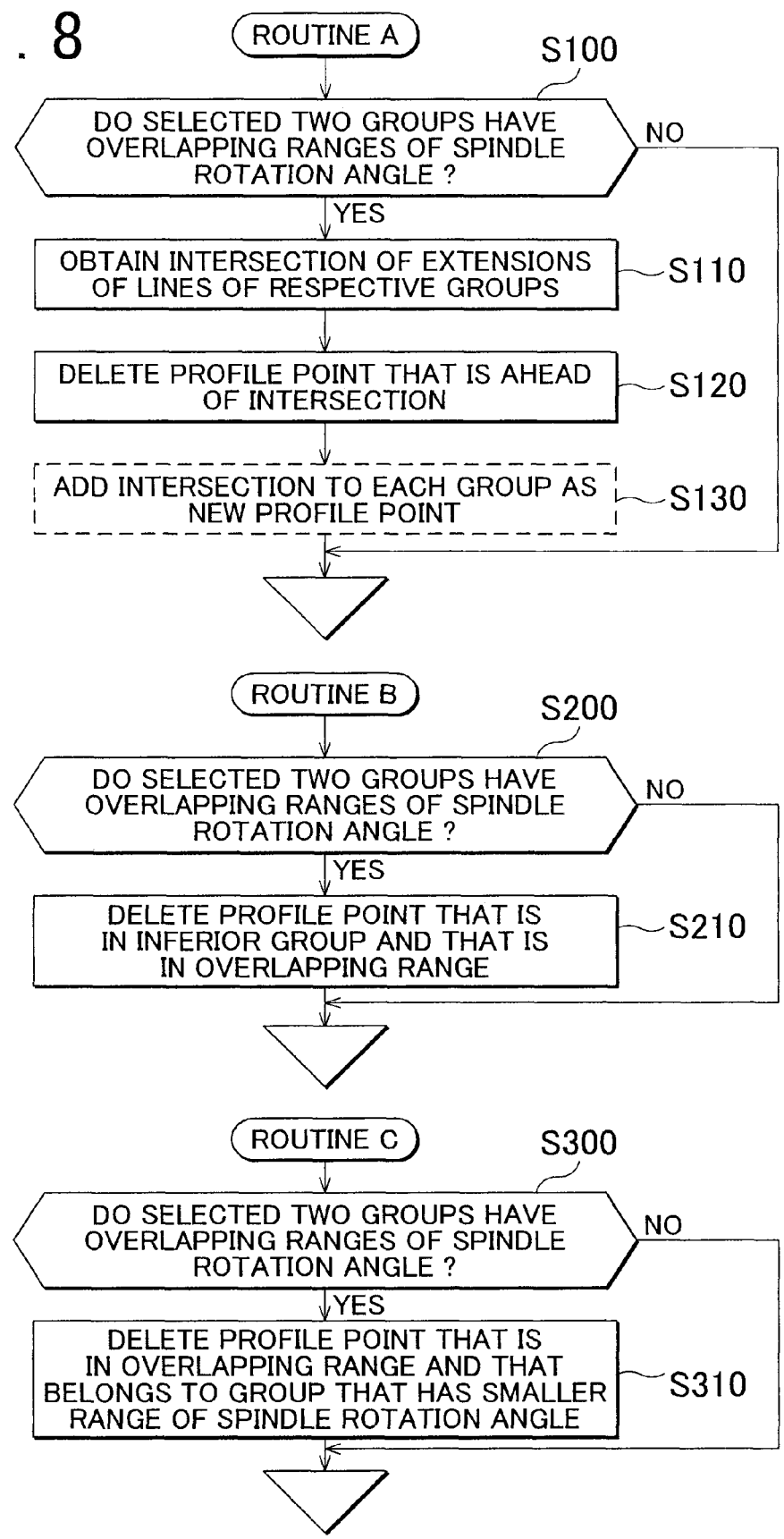

… (1)

METHOD FOR CREATING PROFILE DATA USED TO PROCESS NON-CIRCULAR WORKPIECE

INCORPORATION BY REFERENCE

The disclosure of Japanese Patent Application No. 2008-136527 filed on May 26, 2008 including the specification, drawings and abstract is incorporated herein by reference in its entirety.

BACKGROUND OF THE INVENTION

1. Field of the Invention

The invention relates to a method for creating profile data used to process a non-circular workpiece. More specifically, the invention relates to a method according to which profile data is created based on lift data and corrections are made to the profile data, the profile data being used to control the reciprocation position of a tool in synchronization with rotation of a non-circular workpiece, for example, a cam, about its rotation axis when the workpiece undergoes a grinding process.

2. Description of the Related Art

According to an existing technology, when a non-circular workpiece, for example, a cam, is processed by a grinding machine that includes a rotating grinding wheel, lift data used to identify the shape of the workpiece is converted into profile data that indicates a control amount which is used by a numerical control unit for the grinding machine, and the workpiece is processed based on the profile data. Next, lift data will be described with reference to FIG. 4A. The lift data is used to identify the shape of a non-circular workpiece. In the lift data, a lift amount (L) is set (obtained) based on a rotation angle of the workpiece (lift data rotation angle α) (detailed description will be provided later). As shown in the left view in FIG. 4A, when the lift data rotation angle α is 0 degrees (α=0°), a contact point SP(0) between a cam W and a tappet face TM is positioned right under a rotation axis Pw of the cam W, and (α=0°, lift amount L(0)) is the lift data. When the cam W at a portion at the contact point SP(0) with the tappet face TM is ground by a grinding wheel T, the grinding wheel T is at the position shown in the left view in FIG. 4B. A spindle rotation angle θ(α) at this position is θ(0). In this case, an inter-axis distance D(θ(0)) from the rotation axis Pw of the cam W (that is, the rotation axis of a spindle) to a grinding wheel rotation axis Pt is equal to the sum of a radius Rw of a circular portion of the cam W and a grinding wheel radius Rt. (Spindle rotation angle θ(0), inter-axis distance D(θ(0))) is the profile data that is obtained by converting the lift data (α=0°, lift amount L(0)).

As shown in the right view in FIG. 4A, when the lift data rotation angle α is 135 degrees (α=135°), the contact point SP(135) between the cam W and the tappet face TM is apart from the position right under the rotation axis Pw of the cam W, and (α=135°, lift amount L(135)) is the lift data. When the cam W at a portion at the contact point SP(135) with the tappet face TM is ground by the grinding wheel T, the grinding wheel T is at the position shown in the right view in FIG. 4B. The spindle rotation angle θ(α) at this position is θ(135). The spindle rotation angle θ(135) is a value that is larger than 135°, as shown in the right view in FIG. 4B, and is calculated based on the lift data and the grinding wheel radius Rt. The inter-axis distance D(θ(135)) is a value that is larger than the sum of the radius Rw of the circular portion of the cam W and the grinding wheel radius Rt as shown in the right view in FIG. 4B, and is calculated based on the lift data and the grinding wheel radius Rt. (Spindle rotation angle θ(135), inter-axis distance D(θ(135))) is the profile data that is obtained by converting the lift data (α=135°, lift amount L(135)).

However, various errors may be caused when the lift data is converted into the profile data. In such a case, corrections need to be made. For example, Japanese Patent Application Publication No. 1-206406 (JP-A-1-206406) describes a numerical control unit for processing a non-circular workpiece. The numerical control unit obtains corrected lift data by smoothing lift data based on a permissible error for the shape of a finished product, and converts the corrected lift data into profile data. In this way, an error in the shape of the finished product falls within a permissible error range and the workpiece is processed at a higher speed and within a relatively short time. Japanese Patent Application Publication No. 9-160623 (JP-A-9-160623) describes a numerical control unit for processing a workpiece. The numerical control unit creates the profile data in a manner similar to that described in JP-A-1-206406. However, the numerical control unit described in JP-A-9-160623 designates a range in which lift data is smoothed. In this way, the time required to calculate the corrected lift data is reduced, which makes it possible to process a workpiece in a shorter time.

According to the technologies described in JP-A-1-206406 and JP-A-9-160623, the lift data is corrected and the corrected lift data is converted into the profile data. However, the profile data obtained by converting the corrected lift data are not smoothly continuous, in some cases. For example, if the lift data arranged in the order of the lift data rotation angle are sequentially converted into the profile data, the manner in which the spindle rotation angle is changed may be reversed at part of profile data. If the workpiece is processed by the grinding machine without making any corrections, a portion of the cam W, which is within the range in which the spindle rotational direction is reversed, is ground each time the spindle rotational direction is reversed. This may affect the accuracy of the shape of the finished product. Even if the profile points, each of which indicates the tool reciprocation position that corresponds to the spindle rotation angle obtained based on the profiled data, are connected to each other with a smooth line in order to correct the profile data, a wave may be formed in the interpolation curve. This may affect the processing accuracy. The profile point at which the manner in which the spindle rotation angle is reversed may be just deleted. However, the line that connects the profile points to each other does not extend smoothly and a wave (step in the inter-axis distance) may be formed. This may affect the processing accuracy.

SUMMARY OF THE INVENTION

The invention provides a method for creating profile data used to process a non-circular workpiece, according to which appropriate corrections are made to profile data obtained by converting lift data (or corrected lift data) on the non-circular workpiece to improve the processing accuracy.

An aspect of the invention relates to a method for creating profile data used to process a non-circular workpiece. The profile data indicates the relationship between a spindle rotation angle and a tool reciprocation position. The spindle rotation angle is a rotation angle of a spindle, which causes rotation of the non-circular workpiece about the rotation axis of the workpiece, when the workpiece is ground by a tool that reciprocates with respect to the workpiece in the direction which intersects with the rotation axis of the workpiece in synchronization with the rotation of the workpiece. The tool reciprocation position is a position of the tool in the direction which intersects with the rotation axis of the workpiece and corresponds to the spindle rotation angle. The method includes: reading, lift data in which a lift amount is set based on a lift data rotation angle, which is a rotation angle of the workpiece when the workpiece is rotated about the rotation axis of the workpiece, in order to identify the shape of the non-circular workpiece; calculating a profile point group that is formed of a plurality of profile points each of which indicates the tool reciprocation position that corresponds to the spindle rotation angle based on the read lift data; dividing the calculated profile point group into a plurality of groups each of which is formed of the profile points that satisfy a group division condition set in advance; selecting two groups that satisfy a group comparison condition set in advance from among the plurality of groups; and deleting the profile point that satisfies a specific point deletion condition which is set in advance for a combination of the selected two groups.

According to the method for creating the profile data in the aspect of the invention described above, when the non-circular workpiece is ground by a tool, for example, a cutting bite (the position of a cutting portion of the tool, which contacts the workpiece, does not change), the profile point group that forms the profile data is divided into a plurality of groups, and appropriately selected two groups are compared with each other. Thus, the unnecessary profile point is appropriately determined, and a profile point group that does not include a specific point and that is formed of profile points aligned on a smooth line is obtained. Thus, the processing accuracy is improved.

In the aspect of the invention described above, the tool may be a substantially cylindrical rotating grinding wheel. In this case, the workpiece is ground at a cylinder face of the rotating grinding wheel. In this case, the radius of the rotating grinding wheel is read in addition to the lift data, and the profile point group is calculated based on the radius of the rotating grinding wheel in addition to the lift data.

With the configuration described above, when the non-circular workpiece is ground by the grinding wheel (the position of a cutting portion of the grinding wheel, which contacts the workpiece, changes depending on the portion of the workpiece, which is ground), the profile point group that forms the profile data is divided into a plurality of groups, and appropriately selected two groups are compared with each other. Thus, the unnecessary profile point is appropriately determined, and a profile point group that does not include a specific point and that is formed of profile points aligned on a smooth line is obtained. Thus, the processing accuracy is improved.

In the aspect of the invention described above, in a case where the profile points are arranged in the order in which the lift data rotation angle is increased or in the order in which the lift data rotation angle is decreased, the profile point that satisfies the group division condition may be the profile point that is within a range of the spindle rotation angle up to a spindle rotation angle at which a manner in which the spindle rotation angle is changed is reversed.

With the configuration described above, it is possible to appropriately and easily divide the profile point group into the plurality of groups in order to determine the unnecessary profile point. Thus, it is possible to create the profile data in a shorter time.

In the aspect of the invention described above, the two groups that satisfy the group comparison condition may be the two groups that have overlapping ranges of the spindle rotation angle.

With the configuration described above, it is possible to appropriately and easily select the two groups that are compared with each other in order to determine the unnecessary profile point. Thus, it is possible to create the profile data in a shorter time.

In the aspect of the invention described above, in a case where each of the groups obtained by dividing the profile point group is classified as a superior group, in which the number of the profile points is equal to or larger than a predetermined value or of which a range of the spindle rotation angle is equal to or larger than a predetermined value, or an inferior group, in which the number of the profile points is smaller than the predetermined value or of which the range of the spindle rotation angle is smaller than the predetermined value, and a combination of the two groups that are selected based on the group comparison condition is a combination of a superior group and an inferior group, the profile point that satisfies the specific point deletion condition may be the profile point that belongs to the inferior group and that is within the overlapping range of the spindle rotation angle.

With the configuration described above, when the profile points that belong to the superior group and the profile points that belong to the inferior group are compared with each other, the unnecessary profile point that belongs to the inferior group is appropriately determined and deleted. As a result, it is possible to obtain a profile point group in which the line that connects the profile points each other does not include a step and is smooth. Thus, the processing accuracy is improved.

In the aspect of the invention described above, in a case where each of the groups obtained by dividing the profile point group is classified as a superior group, in which the number of the profile points is equal to or larger than a predetermined value or of which a range of the spindle rotation angle is equal to or larger than a predetermined value, or an inferior group, in which the number of the profile points is smaller than the predetermined value or of which the range of the spindle rotation angle is smaller than the predetermined value, and a combination of the two groups that are selected based on the group comparison condition is a combination of an inferior group and an inferior group, the profile point that satisfies the specific point deletion condition may be the profile point that belongs to the inferior group of which the range of the spindle rotation angle is smaller than the range of the spindle rotation angle of the other inferior group, and that is within the overlapping range of the spindle rotation angle.

With the configuration described above, when the profile points that belong to the inferior group and the profile points that belong to the inferior group are compared with each other, the unnecessary profile point that belongs to the inferior group is appropriately determined and deleted. As a result, it is possible to obtain a profile point group in which the line that connects the profile points each other does not include a step and is smooth. Thus, the processing accuracy is improved.

In the aspect of the invention described above, in a case where each of the groups obtained by dividing the profile point group is classified as a superior group, in which the number of the profile points is equal to or larger than a predetermined value or of which a range of the spindle rotation angle is equal to or larger than a predetermined value, or an inferior group, in which the number of the profile points is smaller than the predetermined value or of which the range of the spindle rotation angle is smaller than the predetermined value, and a combination of the two groups that are selected based on the group comparison condition is a combination of a superior group and a superior group, the profile point that satisfies the specific point deletion condition may be the profile point that is ahead of an intersection of a line that connects the profile points in one of the selected two groups to each other and a line that connects the profile points in the other of the selected two groups to each other, or ahead of an intersection of extension lines of the lines, and that is within the overlapping range of the spindle rotation angle.

With the configuration described above, when the profile points that belong to the superior group and the profile points that belong to the superior group are compared with each other, the unnecessary profile point that belongs to the inferior group is appropriately determined and deleted. As a result, it is possible to obtain a profile point group in which the line that connects the profile points each other does not include a step and is smooth. Thus, the processing accuracy is improved.

In the configuration described above, the intersection may be added as a new profile point.

With the configuration described above, the intersection is added as an appropriate profile point. As a result, it is possible to obtain a profile point group in which the line that connects the profile points each other is more smooth. Thus, the processing accuracy is further improved.

BRIEF DESCRIPTION OF THE DRAWINGS

The features, advantages, and technical and industrial significance of this invention will be described in the following detailed description of an example embodiment of the invention with reference to the accompanying drawings, wherein the same or corresponding portions will be denoted by the same reference numerals and wherein:

FIGS. 5A, 5B and 5C are graphs showing a first example of a method for creating profile data;

FIG. 8 illustrates flowcharts showing profile data creating routines.

DETAILED DESCRIPTION OF THE EMBODIMENTS

Figure 1:
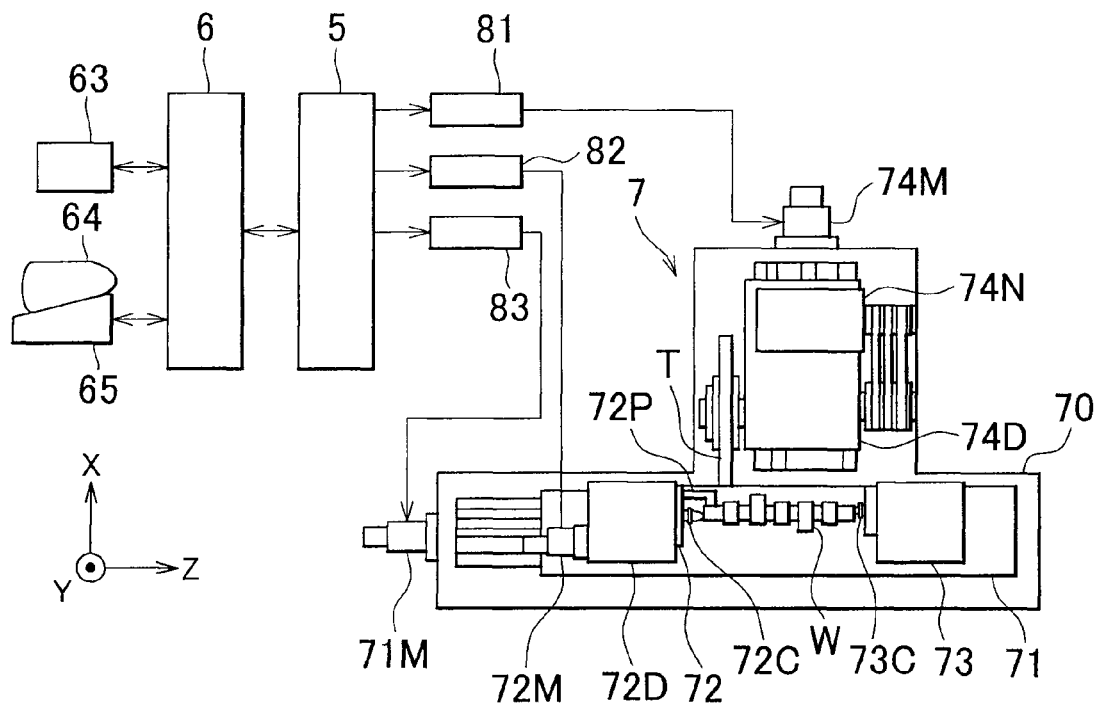
FIG. 1 is a view illustrating an example of a machine tool to which a "method for creating profile data used to process a non-circular workpiece" according to the invention is applied.
Figure 2:
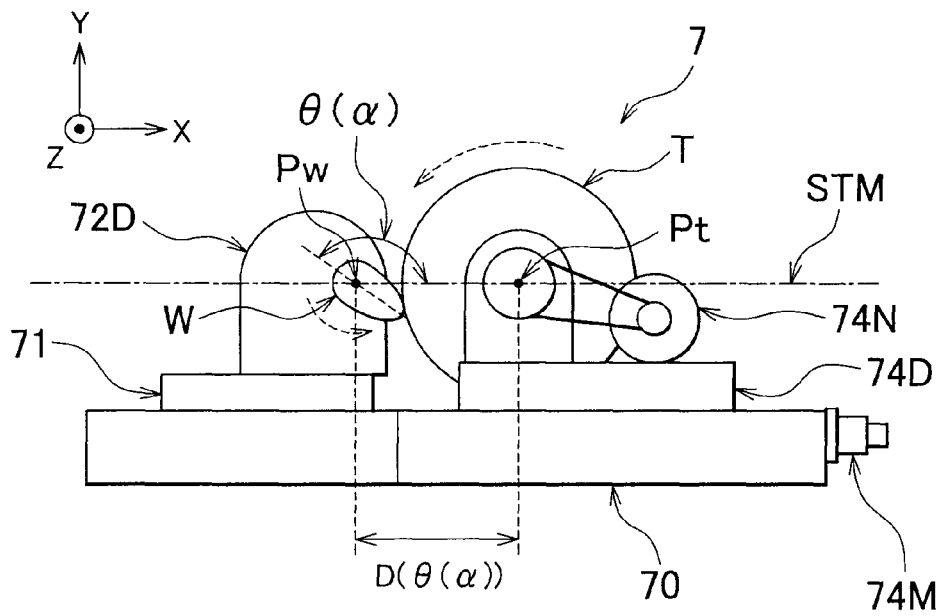
FIG. 2 is an example of a side view of a grinding machine in FIG. 1.

Hereafter, an embodiment of the invention will be described with reference to the accompanying drawings. FIG. 1 shows an example of a machine tool 1 to which a "method for creating profile data used to process a non-circular workpiece" according to the invention is applied. A grinding machine 7 of the machine tool 1 is shown in a plane view. FIG. 2 shows an example of a right side view of the grinding machine 7 (tailstock device 73, etc are not shown in FIG. 2). Note that, in all the drawings in which X-axis, Y-axis, and Z-axis are shown, the X-axis, the Y-axis and the Z-axis are perpendicular to each other, the Y-axis represents the vertically upward direction, and the X-axis and the Z-axis represent the horizontal directions that are perpendicular to each other. A cam W that is formed on a camshaft will be described as an example of a non-circular workpiece. A substantially cylindrical grinding wheel T that grinds the workpiece at a cylinder face of the grinding wheel T while rotating will be described as an example of a grinding tool.

The schematic structure of the machine tool 1 will be described with reference to FIGS. 1 and 2. As shown in the example in FIG. 1, the machine tool 1 described in the embodiment of the invention includes an input unit 65, for example, a keyboard, a display unit 64, for example, a monitor, a data reading unit 63, for example, a tape reader, an automatic programming unit 6, a numerical control unit 5, drive units 81, 82 and 83, and the grinding machine 7. The data reading unit 63 reads various data in response to an operation performed by a worker with the use of the input unit 65 and the display unit 64. In this case, the data reading unit 63 reads lift data used to identify the shape of a non-circular workpiece (the cam W, in this case), and the radius of the grinding wheel T. If a plurality of cams W is formed on the camshaft, the lift data varies among the cams W because the phase varies among the cams W.

In the grinding machine 7 shown in FIGS. 1 and 2, a worktable 71 and a grinding wheel table 74D are placed on a bed 70. The worktable 71 may be reciprocated in the Z-axis direction by a worktable drive unit 71M. The grinding wheel table 74D may be reciprocated in the X-axis direction by a grinding table drive unit 74M. A spindle unit 72D and the tailstock device 73 are placed on the worktable 71. The spindle unit 72D includes a spindle 72 that rotates about a spindle rotation axis that extends in the Z-axis direction and that passes the center of a center 72C (the spindle 72 may be rotated by a spindle drive unit 72M). The tailstock device 73 includes a center 73C that is provided on the spindle rotation axis. The camshaft on which the cam W is formed is clamped between the center 72C and the center 73C. The spindle 72 is provided with a positioning pin 72P that is used to make the rotational phase of the workpiece to coincide with the rotational phase of the spindle 72. The workpieces has a fit portion (not shown) in which the positioning pin 72P is fitted. The workpiece (camshaft, in this case) is positioned and clamped between the center 72C and the center 73C in such a manner that the positioning pin 72P is fitted in the fit portion. The grinding wheel T that is rotated by a grinding wheel drive unit 74N is placed on the grinding wheel table 74D.

The numerical control unit 5 may transmit a control signal to the grinding wheel table drive unit 74M via the drive unit 81 to control the tool reciprocation position, which is the position of the grinding wheel table 74D in the X-axis direction. The numerical control unit 5 may transmit a control signal to the spindle drive unit 72M via the drive unit 82 to control the rotation angle of the spindle 72 (hereinafter, referred to as "spindle rotation angle" where appropriate). The numerical control unit 5 may transmit a control signal to the worktable drive unit 71M via the drive unit 83 to control the position of the worktable 71 in the Z-axis direction. The numerical control unit 5 may transmit a control signal to the grinding wheel drive unit 74N via a drive unit (not shown) to control the rotation of the grinding wheel T. Although not shown, the drive unit 82 obtains the actual spindle rotation angle based on a detection signal from, for example, an encoder of the spindle drive unit 72M and executes feedback control, the drive unit 81 obtains the actual position of the grinding wheel table 74D in the X-axis direction based on a detection signal from, for example, an encoder of the grinding wheel table drive unit 74M and executes feedback control, and the drive unit 83 obtains the actual position of the worktable 71 in the Z-axis direction based on a detection signal from, for example, an encoder of the worktable drive unit 71M and executes feedback control.

As shown in FIG. 2, the camshaft on which the cam W is formed is clamped between the center 72C and the center 73C in such a manner that a workpiece rotation axis Pw, which is the rotation axis of the camshaft on which the cam W is formed, coincides with the spindle rotation axis which is the rotation axis of the spindle 72. In the grinding machine 7 described in the embodiment of the invention, the spindle rotation axis (that coincides with the workpiece rotation axis Pw, in the example shown in FIG. 2) and a grinding wheel rotation axis Pt, which is the rotation axis of the grinding wheel T, are on a same horizontal plane STM.

Figure 3:
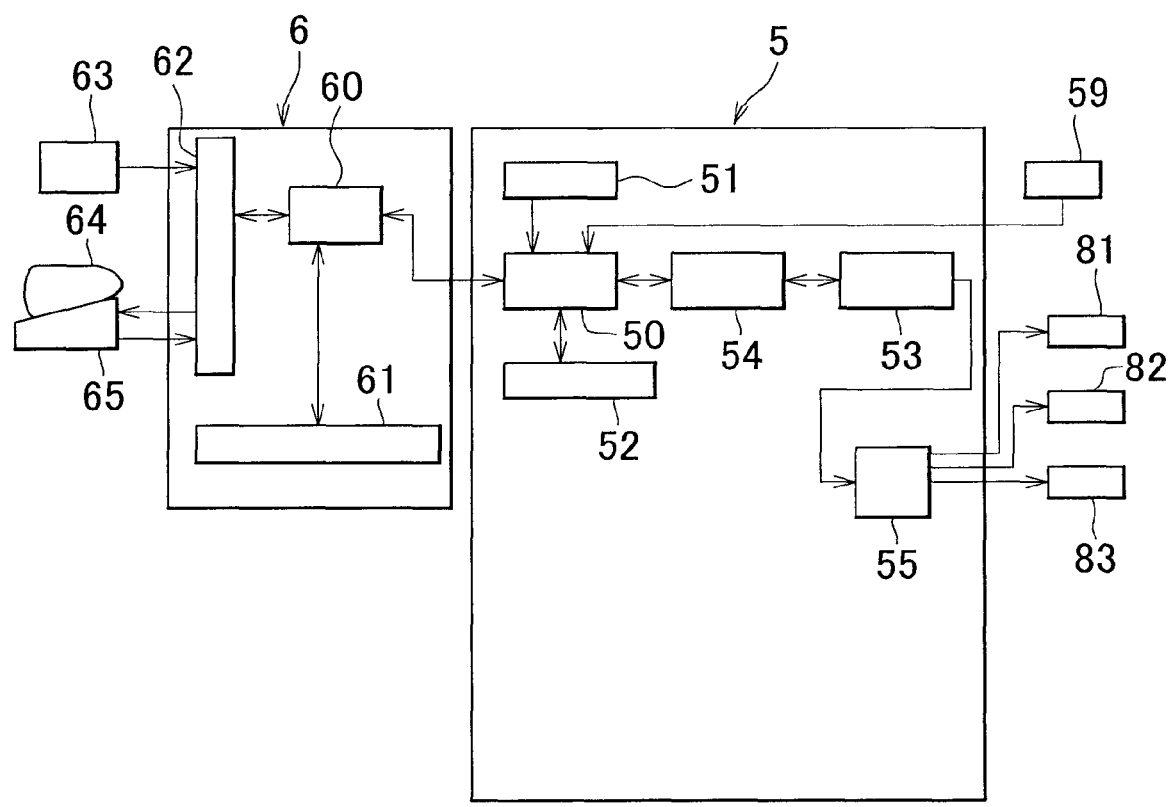
FIG. 3 is a view illustrating an example of the structure of an automatic programming unit and the structure of a numerical control unit.

Next, the structure of the automatic programming unit 6 and the structure of the numerical control unit 5 will be described with reference to FIG. 3. The automatic programming unit 6 includes an input/output interface 62, a control unit 60, for example, a central processing unit (CPU), and a storage unit 61, for example, a random access memory (RAM). The automatic programming unit 6 obtains profile data that includes a profile point group formed of a plurality of profile points each of which indicates a tool reciprocation position $D(\theta)$ that corresponds to a spindle rotation angle $\theta$ of the spindle 72, based on the lift data obtained from the data reading unit 63 and the grinding wheel radius (radius of the grinding wheel T) stored in the storage unit 61.

The numerical control unit 5 includes a main control unit 50 (e.g. CPU) that controls the grinding machine 7, a read only memory (ROM) 51 that stores control programs, etc., a RAM 52 that stores input data, etc., and a drive control unit 53 (e.g. CPU) that controls the drive units 81 to 83. The numerical control unit 5 includes a RAM 54 and a distribution circuit 55. The RAM 54 is used when positioning data on the grinding wheel table 74D (position of the grinding wheel rotation axis Pt of the grinding wheel T in the X-axis direction, in this case) calculated by the main control unit 50, rotation angle data on the spindle 72 (rotation angle of the cam W that will be ground, in this case) calculated by the main control unit 50, and positioning data on the worktable 71 (position of the cam W that will be ground in the Z-axis direction, in this case) calculated by the main control unit 50 are provided to the drive control unit 53. The distribution circuit 55 executes pulse distribution for the drive units 81 to 83 based on positioning data on which, for example, interpolation is executed by the drive control unit 53. The numerical control unit 5 transmits a control signal to the worktable drive unit 71M via the drive unit 83 so that the cam W that will be ground and the grinding wheel T face each other. The numerical control unit 5 receives the profile data obtained by the automatic programming unit 6, calculates a control amount by which the spindle rotation angle is controlled, and transmits a control signal to the spindle drive unit 72M via the drive unit 82. The numerical control unit 5 calculates a control amount by which the tool reciprocation position, which is the position of the grinding wheel table 74D in the X-axis direction and which corresponds to the spindle rotation angle, and transmits a control signal to the grinding wheel table drive unit 74M via the drive unit 81. A control panel 59 includes an input unit that is operated by a worker when the cam W is ground, a display unit that displays the input result, etc.

Figure 4A:
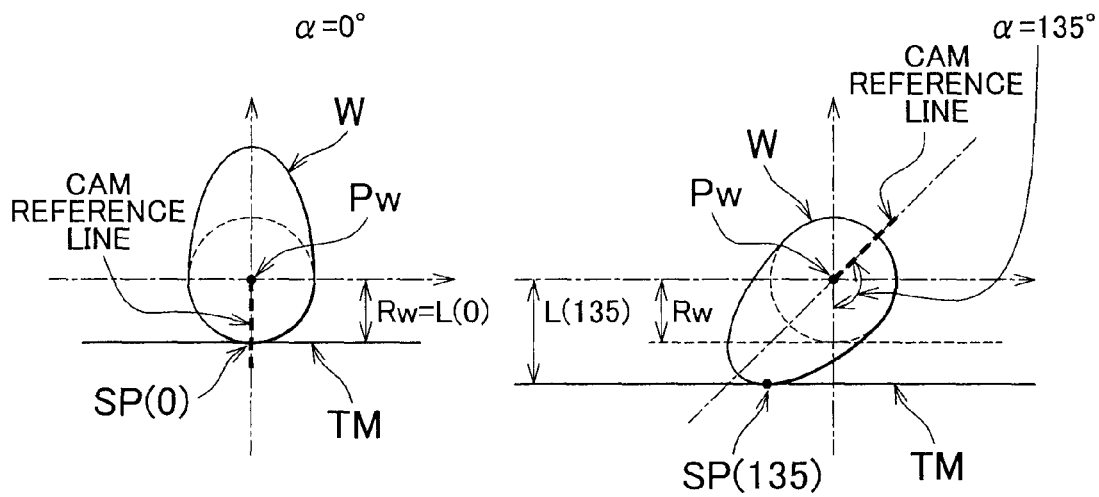
FIGS. 4A and 4B are views for describing the concept based on which lift data is converted into profile data.
Figure 4B:
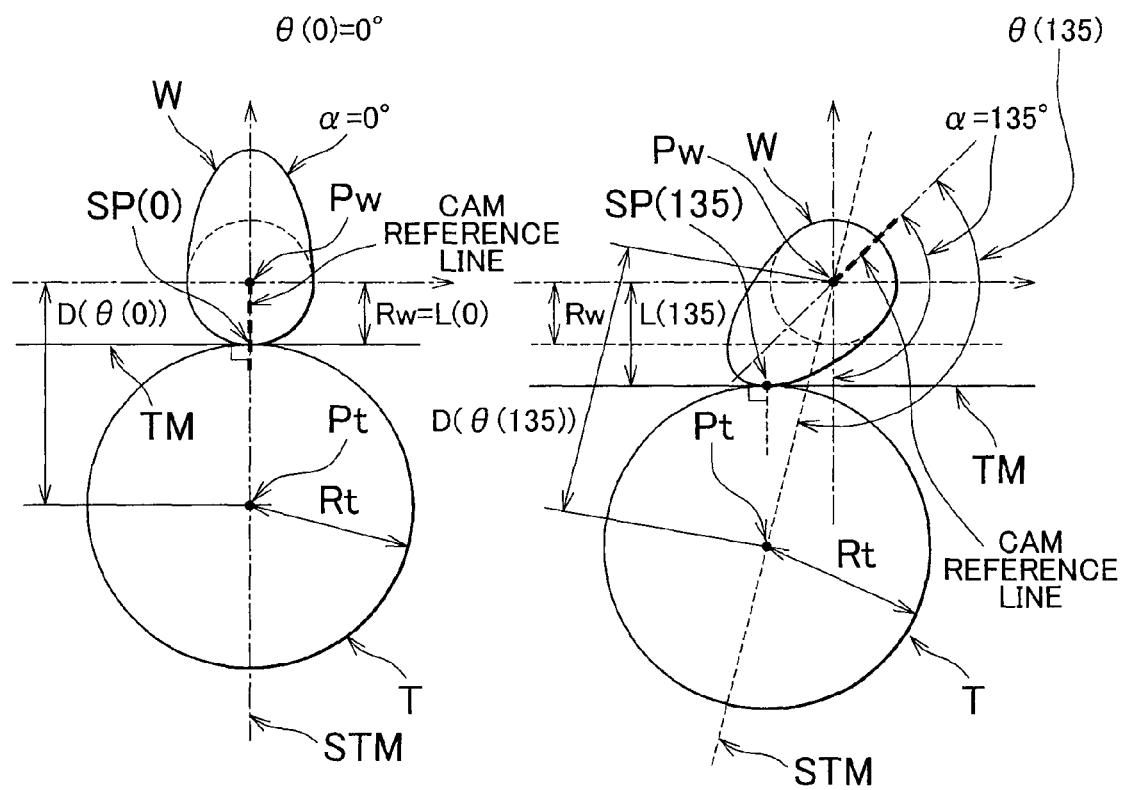

Next, conversion from the lift data to the profile data will be described with reference to FIGS. 4A and 4B. First, the manner for setting the lift data will be described with reference to FIG. 4A. The "cam reference line" shown in FIGS. 4A and 4B is a line that is used to indicate the position of the cam W using the fit portion, which is formed in the workpiece in order to make the rotational phase of the workpiece to coincide with the rotational phase of the spindle, as a reference. The cam W described in the embodiment of the invention has a non-circular portion and a circular portion, and the circular portion is on the opposite side of the workpiece rotation axis Pw from the non-circular portion. The left view in FIG. 4A shows the position of a tappet face TM when a lift data rotation angle $\alpha$, which is the rotation angle of the cam W about the workpiece rotation axis Pw, is 0 degrees ($\alpha=0°$). In this case, a lift amount $L(\alpha)$, which is the distance from the workpiece rotation axis Pw to the tappet face TM, is equal to a radius Rw of the circular portion (lift amount $L(0)=Rw$). ($\alpha=0°$, lift amount $L(0)$) is the lift data for the lift data rotation angle $\alpha$ of $0°$.

The right view in FIG. 4A shows the position of the tappet face TM when the lift data rotation angle is 135 degrees ($\alpha=135°$). In this case, the lift amount is $L(135)$. ($\alpha=135°$, lift amount $L(135)$) is the lift data for the lift data rotation angle $\alpha$ of $135°$. The lift data is a data group in which the lift amounts $L(\alpha)$ are set (obtained) based on various lift data rotation angles $\alpha$. In the description above, the distance from the workpiece rotation axis Pw to the tappet face TM is used as the lift amount $L(\alpha)$. Alternatively, a lift amount $L'(\alpha)$, which is the difference between the distance from the workpiece rotation axis Pw to the tappet face TM and the radius Rw of the circular portion of the cam W ($L'(\alpha)=L(\alpha)-Rw$), may be used.

Next, the manner for converting the lift data to the profile data will be described with reference to FIG. 4B. In the left view in FIG. 4A in which the lift data rotation angle $\alpha$ is 0 degrees ($\alpha=0°$), a contact point SP(0) between the cam W and the tappet face TM is positioned right under the workpiece rotation axis Pw. In order to grind the cam W at a portion at the contact point SP(0), the grinding wheel T is placed in the position in the left view in FIG. 4B. In this case, the workpiece rotation axis Pw of the cam W, the grinding wheel rotation axis Pt of the grinding wheel T and the contact point SP(0) are aligned on a straight line. This position is used as the reference position during a grinding process. At the reference position, the spindle rotation angle $\theta$ in the grinding machine 7 shown in FIG. 2 is 0 degrees. In this case, the distance $D(\theta(0))$ between the spindle rotation axis (i.e., workpiece rotation axis Pw) and the grinding wheel rotation axis Pt (hereinafter, referred to as "inter-axis distance $D(\theta(\alpha))$") is equal to the sum of the radius Rw of the circular portion of the cam W and a radius Rt of the grinding wheel T. That is, the profile data obtained by converting the lift data of ($\alpha=0°$, lift amount $L(0)$) is (spindle rotation angle $\theta(0)$ ($=0°$), inter-axis distance $D(\theta(0))$ ($=$radius Rw+radius Rt)).

In the right view in FIG. 4A in which the lift data rotation angle $\alpha$ is 135 degrees ($\alpha=135°$), the contact point SP(135) between the cam W and the tappet face TM is not positioned right under the workpiece rotation axis Pw. In order to grind the cam W at a portion at the contact point SP(135), the grinding wheel T is placed in the position in the right view in FIG. 4B. In this case, the spindle rotation angle $\theta(135)$ formed between the line that connects the workpiece rotation axis Pw to the grinding wheel rotation axis Pt (horizontal plane STM in FIG. 2) and the cam reference line is larger than the lift data rotation angle $\alpha(135°)$. The inter-axis distance $D(\theta(135))$ in this case is longer than the sum of the radius Rw of the circular portion of the cam W and the radius Rt of the grinding wheel T. The spindle rotation angle $\theta(135)$ and the inter-axis distance $D(\theta(135))$ may be obtained based on the lift data and the grinding wheel radius Rt according to an existing method. That is, the profile data that is obtained by converting the lift data of ($\alpha=135°$, lift amount $L(135)$) is (spindle rotation angle $\theta(135)$, inter-axis distance $D(\theta(135))$).

Next, a first example of a method for creating the profile data based on the lift data and the radius of the grinding wheel T will be described with reference to FIGS. 5, 7 and 8. A creation routine is executed according to flowcharts shown in FIGS. 7 and 8. The creation routine may be executed by the control unit 60 of the automatic programming unit 6, or executed by the main control unit 50 of the numerical control unit 5. In the description below, the creation routine is executed by the main control unit 50 of the numerical control unit 5.

Hereafter, an example in which the main control unit 50 of the numerical control unit 5 converts lift data A(0) to A(9) (not shown) into profile data B(0) to B(9) (profile point group) and makes correction to the profile point group will be described. The control unit 60 of the automatic programming unit 6 may convert the lift data A(0) to A(9) (not shown) into the profile data B(0) to B(9), and the main control unit 50 may receive the profile data B(0) to B(9) from the control unit 60 and make corrections to the profile point group. In this case, step (hereinafter, referred to as "S") 5 and S10 in FIG. 7 are executed by the control unit 60, and the main control unit 50 receives the profile data B(0) to B(9) from the control unit 60 before executing S20. In the description below, each of the data ((spindle rotation angle θ, inter-axis distance D(θ))) contained in the profile data will be referred to as a profile point B(n). When the lift data A(0) to A(9) are sequentially arranged in the order in which the lift data rotation angle α increases (or decreases), the profile points B(0) to B(9) are also arranged in this order. In FIGS. 5A to 5C, the profile point B(n) ((spindle rotation angle θ, inter-axis distance D(θ))) is indicated in a graph showing the relationship between the spindle rotation angle θ and the inter-axis distance D(θ).

For example, when the profile points B(0) to B(9) are arranged in the manner shown in FIG. 5A, if the spindle rotation angle θ of the spindle 72 and the inter-axis distance D(θ) (the position of the grinding wheel table 74D in the X-axis direction, in this case) are controlled in the order of the profile points B(0), B(1), B(2), B(3), B(4), B(5), B(6), B(7), B(8), and B(9), the spindle 72 is rotated in the following manner. Between the profile point B(3) and the profile point B(4), the spindle 72 is rotated in the direction opposite to the direction in which the spindle 72 is rotated in a range from the profile point B(0) to the profile point B(3). Then, between the profile point B(5) to B(6), the spindle 72 is rotated in the direction opposite to the direction in which the spindle 72 is rotated in a range from the profile point B(3) to the profile point B(5) (rotated in the original rotational direction). In this case, the cam W is ground three times while the rotational direction of the spindle 72 is repeatedly reversed within a range between the spindle rotation angle at the profile points B(3) and the spindle rotation angle at the profile point B(5). This may affect the processing accuracy. Therefore, in an existing technology, the profile points within a range in which the rotational direction of the spindle 72 is reversed (profile points B(4) and B(5), in this case) are deleted. According to this technology, however, the relationship between the spindle rotation angle θ and the inter-axis distance D(θ) is as indicated by the two-dot chain line in FIG. 5A as a result of deletion of the profile points B(4) and B(5). Therefore, it is possible to avoid grinding the same portion of the cam W three times by preventing reversal of the rotational direction of the spindle. However, a step may be formed in the shape of the cam W.

Hereafter, description will be provided concerning a method for creating the profile data according to the embodiment of the invention, with which it is possible to avoid grinding of the same portion of the cam W multiple times due to reversal of the rotational direction of the spindle, and to suppress formation of a step in the shape of the cam W, thereby improving the processing accuracy. Next, the routine for creating the profile data according to the embodiment of the invention will be described with reference to the flowcharts shown in FIGS. 7 and 8. Upon reception of, for example, a process executing command from the control panel 59, the main control unit 50 reads the lift data on the cam W which will be ground and the radius of the grinding wheel T in S5 in FIG. 7, and goes to S10. In S10, the main control unit 50 creates the profile data based on the read lift data and the radius of the grinding wheel T and calculates a profile point group formed of a plurality of profile points (calculates a profile point group formed of ten profile points B(0) to B(9) in the example in FIG. 5A), and goes to S20.

In S20, the main control unit 50 divides the calculated profile point group formed of a plurality of profile points into a plurality of groups each of which is formed of the profile points that satisfy a group division condition set in advance. In the embodiment of the invention, a new group is formed each time the manner in which, the rotation angle of the spindle is changed, is reversed. More specifically, when the profile points in the profile point group are arranged in the order in which the lift data rotation angle is increased or in the order in which the lift data rotation angle is decreased, the main control unit 50 forms several groups each of which includes the profile points within a range of up to the profile point at which the manner, in which the spindle rotation angle is changed, is reversed. Then, the main control unit 50 classifies each of the groups obtained by dividing the profile point group as a superior group or an inferior group, and goes to S30. A method for dividing the profile point group into several groups and a method for classifying each of the groups as a superior groups or an inferior groups will be described below in detail.

In the example in FIG. 5A, the main control unit 50 sequentially connects the profile points to each other with a line starting from the profile point B(0), recognizes that, between the profile point B(3) and the profile point B(4), the spindle 72 is rotated in the direction opposite to the direction in which the spindle 72 is rotated in the range from the profile point B(0) to the profile point B(3), and forms a group of the profile points B(0) to B(3). Then, the main control unit 50 recognizes that, between the profile point B(S) and the profile point B(6), the spindle 72 is rotated in the direction opposite to the direction in which the spindle 72 is rotated in a range from the profile point B(3) to the profile point B(5), and forms a new group of the profile points B(3) to B(5). Also, the main control unit 50 recognizes that the rotational direction of the spindle 72 is maintained constant in a range from the profile point B(5) to the profile point B(9), and forms another new group of the profile points B(5) to B(9). In this case, each profile point that is on the boundary between the groups (profile points B(3) and B(5), in this case) belongs to each of both the two groups adjacent to the boundary. The main control unit 50 classifies each of the groups as a superior group or an inferior group. For example, the main control unit 50 determines that the group in which the number of profile points is equal to or larger than a predetermined value (e.g. four) is a superior group, and the group in which the number of profile points is smaller than the predetermined value is an inferior group. Alternatively, the main control unit 50 determines that the group of which the range of the spindle rotation angle is equal to or larger than a predetermined value (e.g. 20 degrees) is a superior group, and determines that the group of which the range of the spindle rotation angle is smaller than the predetermined value is an inferior group. For example, when the group in which the number of the profile points is equal to or larger than four is determined to be a superior group, the group formed of the profile points B(0) to B(3) is determined to be a superior group (hereinafter, referred to as "first group (superior group)"), the group formed of the profile points B(3) to B(5) is determined to be an inferior group (hereinafter, referred to as "second group (inferior group)"), and the group formed of the profile points B(5) to B(9) is determined to be a superior group (hereinafter, referred to as "third group (superior group)").

In S30, the main control unit 50 selects the two groups that will be compared with each other in order to delete unnecessary profile points, and goes to S40. For example, the main control unit 50 may select the two groups that have overlapping ranges of the spindle rotation angle (two groups that satisfy a group comparison condition). In this case, the main control unit 50 first selects the first group (superior group) and the second group (inferior group). If the selected two groups do not have overlapping ranges of the spindle rotation angle, the main control unit 50 does not make a comparison and selects the next groups. In S40, the main control unit 50 determines whether the combination of the selected two groups is a combination of a superior group and a superior group. If it is determined that the combination of the selected two groups is the combination of a superior group and a superior group (Yes), the main control unit 50 goes to S100. On the other hand, if it is determined that the combination of the selected two groups is not a combination of a superior group and a superior group (No), the main control unit 50 goes to S45. If the main control unit 50 goes to S100, the main control unit 50 executes a routine A in FIG. 8 and goes to S50. If the main control unit 50 goes to S45, the main control unit 50 determines whether the combination of the two selected groups is a combination of a superior group and an inferior group. If it is determined that the combination of the two selected groups is a combination of a superior group and an inferior group (Yes), the main control unit 50 goes to S200. On the other hand, if it is determined that the combination of the two selected groups is not a combination of a superior group and an inferior group (No), the main control unit 50 goes to S300. If the main control unit 50 goes to S300, the main control unit 50 executes a routine C in FIG. 8, and goes to S50. If the main control unit 50 goes to S200, the main control unit 50 executes a routine B in FIG. 8, and goes to S50. In this case, because the first group (superior group) and the second group (inferior group) are selected, the main control unit 50 executes the routine B in S200.

The routine B will be described in detail with reference to FIG. 8. In S200 shown in FIG. 8, the main control unit 50 determines whether the selected two groups have overlapping ranges of the spindle rotation angle. If it is determined that the selected two groups have overlapping ranges of the spindle rotation angle (Yes), the main control unit 50 goes to S210. On the other hand, if it is determined that the selected two groups do not have overlapping ranges of the spindle rotation angle (No), the main control unit 50 ends the routine B and goes to S50. In this case, because the first group (superior group) and the second group (inferior group) have overlapping ranges of the spindle rotation angle, the main control unit 50 goes to S210. In S210, the main control unit 50 deletes the profile point which is in the overlapping range of the inferior group (profile point that satisfies a specific point deletion condition that is set in advance for the combination of a superior group and an inferior group). In this case, because the profile points B(3), B(4), and B(5) in the second group (inferior group) are within the overlapping range of the spindle rotation angle, the profile points B(3), B(4) and B(5) are deleted, and, as a result, the second group (inferior group) itself is deleted. However, the profile point B(3) in the first group (superior group) is not deleted because this profile point B(3) belongs to the superior group. Also, the profile point B(5) in the third group (superior group) is not deleted because this profile point B(5) belongs to the superior group. It is considered that the profile point B(3) in the first group (superior group) and the profile point B(3) in the second group (inferior group) are different profile points, and the profile point B(5) in the third group (superior group) and the profile point B(5) in the second group (inferior group) are different profile points. Therefore, the second group (inferior group) is deleted, but only the profile point B(4) is deleted as a profile point. Then, the main control unit 50 ends the routine B, and goes to S50. The state shown in FIG. 5B is achieved by executing the process described so far.

Figure 7:
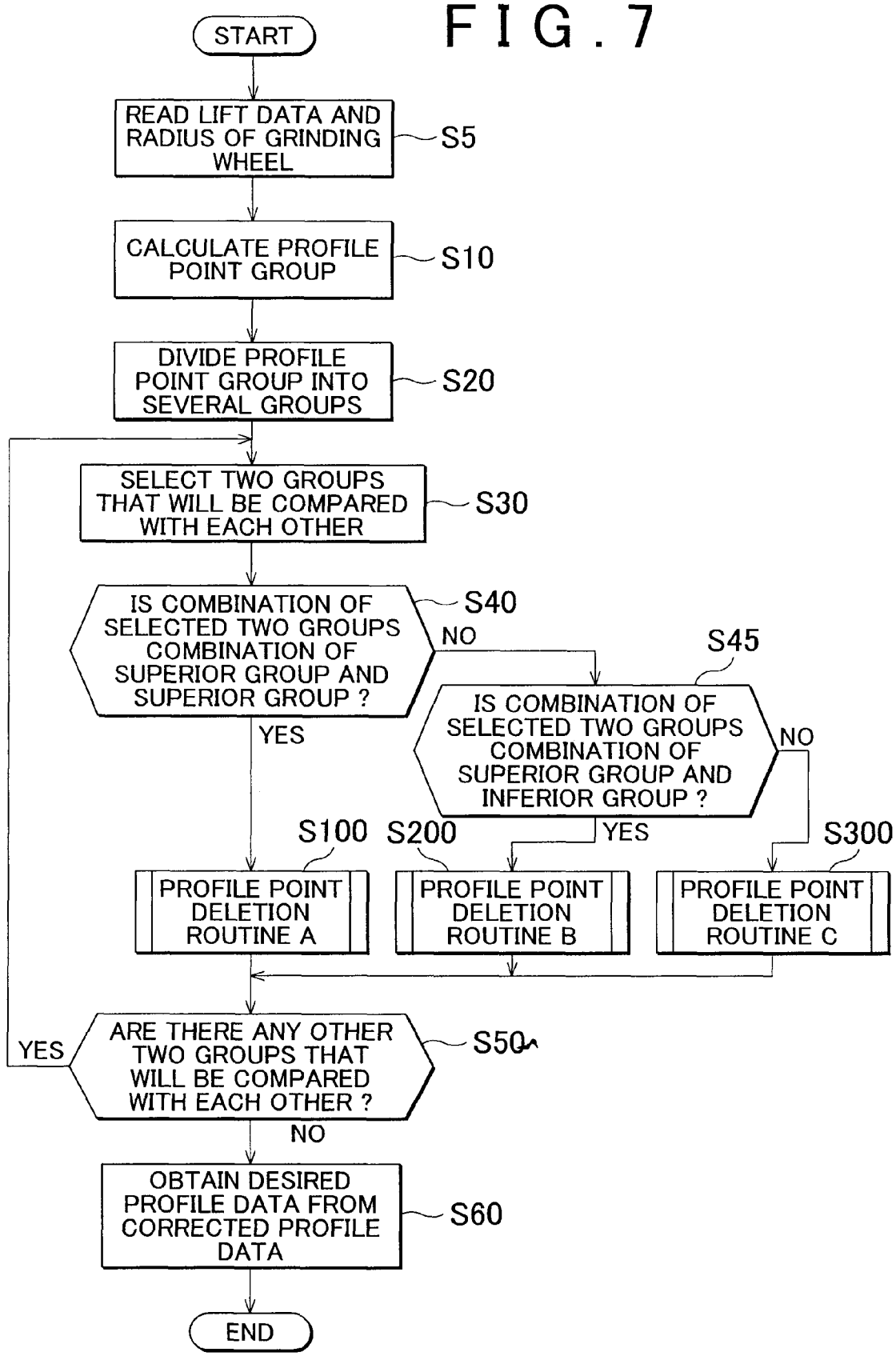
FIG. 7 is a flowchart showing a profile data creating routine.

In S50 shown in FIG. 7, the main control unit 50 determines whether there are other groups that should be compared with each other (i.e., whether there are two other groups that have overlapping ranges of spindle rotation angle). If it is determined that there are two other groups that have overlapping ranges of spindle rotation angle (Yes), the main control unit 50 goes back to S30. On the other hand, if it is determined that there are not two other groups that have overlapping ranges of spindle rotation angle (No), the main control unit 50 goes to S60. In this case, the main control unit 50 goes back to S30, and selects the first group (superior group) and the third group (superior group). Then, the main control unit 50 makes an affirmative determination in S40, and goes to S100.

The routine A will be descried in detail with reference to FIG. 8. In S100 in FIG. 8, the main control unit 50 determines whether the selected two groups have overlapping ranges of the spindle rotation angle. If it is determined that the selected two groups have overlapping ranges of the spindle rotation angle (Yes), the main control unit 50 goes to S110. On the other hand, if it is determined that the selected two groups do not have overlapping ranges of the spindle rotation angle (No), the main control unit 50 ends the routine A and goes to S50. In this case, because the first group (superior group) and the third group (superior group) have overlapping ranges of spindle rotation angle, the main control unit 50 goes to S110. Next, the main control unit 50 obtains, in S110, the intersection of the line that connects the profile points in one of the groups to each other and the line that connects the profile points in the other group to each other, or obtains the intersection of the extension lines of the above-described lines, and goes to S120. In this case, because the first group (superior group) includes the profile points B(0) to B(3) and the third group (superior group) includes the profile points B(5) to B(9), the intersection is obtained without extending the lines. In this case, the intersection is referred to as B(a). In S120, the main control unit 50 deletes the profile point that is located ahead of the intersection from each group (profile point that satisfies a specific point deletion condition that is set in advance for the combination of a superior group and a superior group), and goes to S130. In this case, the profile point B(3) that is located ahead of the intersection B(a) is deleted from the first group (superior group), and the profile point B(5) that is located ahead of the intersection B(a) is deleted from the third group (superior group). In S130, the main control unit 50 adds the intersection B(a) as a new profile point to each of both the groups, after which the main control unit 50 ends the routine A and goes to S50. As a result, the first group (superior group) includes the profile points B(0), B(1), B(2) and B(a), and the third group (superior group) includes the profile points B(a), B(6), B(7), B(8) and B(9). In the embodiment of the invention, the intersection B(a) is added to each of the both groups as a new profile point in S130. However, S130 may be omitted so that the intersection B(a) is not added as a new profile point. The state shown in FIG. 5C is achieved by executing the process described so far.

After executing S50 shown in FIG. 7, the main control unit 50 goes to S60 because there are not two groups that should be compared with each other any more. In S60, the main control unit 50 connects the corrected profile data (profile data obtained by deleting unnecessary profile points (and adding a new profile point) in the process described so far) to each other with a smooth line, and obtains desired profile data on the line. For example, if the profile points in FIG. 5C remain, the main control unit 50 connects these profile points to each other with a smooth line as indicated by the dashed-dotted line, and sets profile points that are apart from each other at intervals of the spindle rotation angle θ of 2°. According to the existing technology, a step (step between the profile point B(3) and the profile point B(6)) is formed in the inter-axis distance D(θ) as indicated by the two-dot chain line in FIG. 5A. However, according to the method in the embodiment of the invention, such a step is not formed, and the line that connects the profile points to each other is smooth as indicated by the dashed-dotted line in FIG. 5C. Thus, the processing accuracy is improved.

Figure 6A:
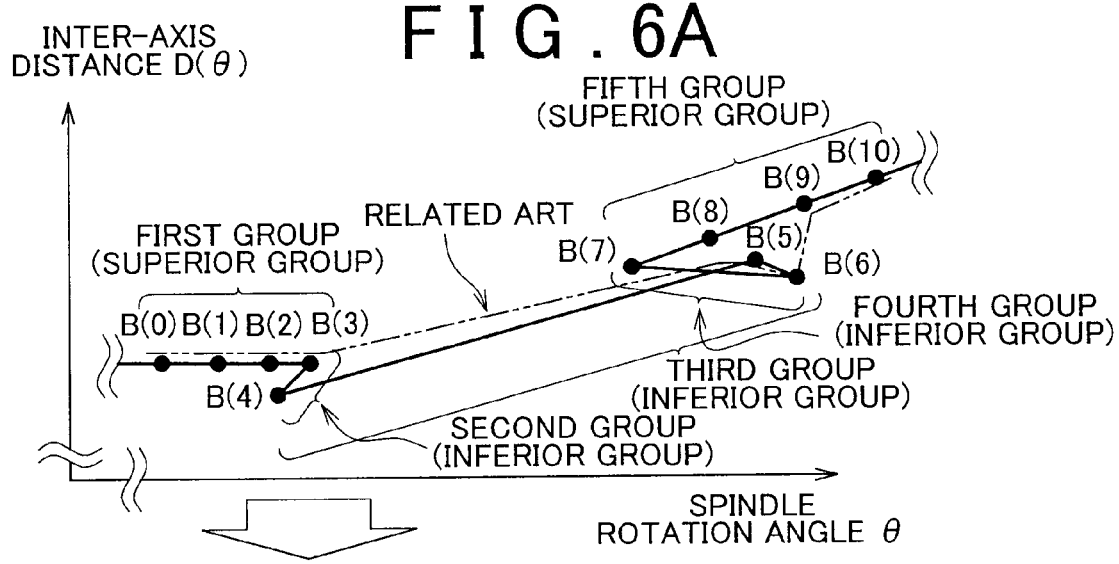
FIGS. 6A, 6B and 6C are graphs showing a second example of a method for creating profile data.

Next, a second example of the method for creating profile data based on the lift data and the radius of the grinding wheel T will be described with reference to FIGS. 6, 7 and 8. A creation routine is executed according to the flowcharts shown in FIGS. 7 and 8. The steps that have been described above will not be described below. In the description below, the creation routine is executed by the main control unit 50. Upon reception of, for example, a processing execution command from the control panel 59, the main control unit 50 reads the lift data on the cam W which will be ground and the radius of the grinding wheel T in S5 shown in FIG. 7, and goes to S10. In S10, the main control unit 50 creates profile data based on the read lift data and the radius of the grinding wheel T, calculates a profile point group that is formed of a plurality of profile points (the profile point group that includes eleven profile points B(0) to B(10) in the example in FIG. 6A), and goes to S20. In S20, the main control unit 50 divides the profile point group into several groups based on the rotational direction of the spindle, and determines that the group that includes four or more profile points is a superior group. In this case, the profile point group is divided into a first group (superior group) (B(0) to B(3)), a second group (inferior group) (B(3) and B(4)), a third group (inferior group) (B(4) to B(6)), a fourth group (inferior group) (B(6) and B(7)), and a fifth group (superior group) (B(7) to B(10)).

When the main control unit 50 executes S30 for the first time, the main control unit 50 selects the first group (superior group) and the second group (inferior group). Because the combination of the first group and the second group is a combination of a superior group and an inferior group, the main control unit 50 executes the routine B in S200. As a result, the second group (inferior group) itself is deleted (profile points B(3) and B(4) that belong to the second group (inferior group) are deleted). However, the profile point B(3) that belongs to the first group (superior group) remains, and the profile point B(4) that belongs to the third group (inferior group) also remains. Then, the main control unit 50 goes to S50, and goes back to S30. In S30, the main control unit 50 selects the next combination of the groups that will be compared with each other, that is, the combination of the first group (superior group) and the third group (inferior group). Because the combination of the first group and the third group is a combination of a superior group and an inferior group, the main control unit 50 executes the routine B in S200. As a result, the profile point B(4) that belongs to the third group (inferior group) is deleted and, consequently, the profile point (4) is removed from the graph. Because the profile points B(5) and B(6) that belong to the third group (inferior group) remain, the profile points B(5) and B(6) form a new third group (inferior group). Then, the main control unit 50 goes to S50, and goes back to S30. In S30, the main control unit 50 selects the next combination of the groups that will be compared with each other, that is, the combination of the third group (inferior group) and the fourth group (inferior group). Because the combination of the third group and the fourth group is a combination of an inferior group and an inferior group, the main control unit 50 executes the routine C in S300.

The routine C will be described in detail with reference to FIG. 8. The main control unit 50 determines in S300 shown in FIG. 8 whether the two groups have overlapping ranges of the spindle rotation angle. If it is determined that the two groups have overlapping ranges of the spindle rotation angle (Yes), the main control unit 50 goes to S310. On the other hand, if it is determined that the two groups do not have overlapping ranges of the spindle rotation angle (No), the main control unit 50 ends the routine C and goes to S50. In this case, because the third group (inferior group) and the fourth group (inferior group) have overlapping ranges of the spindle rotation angle, the main control unit 50 goes to S310. In S310, the main control unit 50 deletes the profile point that is within the overlapping range and that belongs to the group of which the range of the spindle rotation angle is smaller than the range of the spindle rotation angle of the other inferior group (profile point that satisfies a specific point deletion condition that is set in advance for the combination of an inferior group and an inferior group), and the main control unit 50 goes to S50. In this case, because the profile points B(5) and B(6) that belong to the third group (inferior group) are deleted, the third group (inferior group) itself is deleted. The profile point B(6) that belongs to the fourth group (inferior group) remains.

Figure 6B:
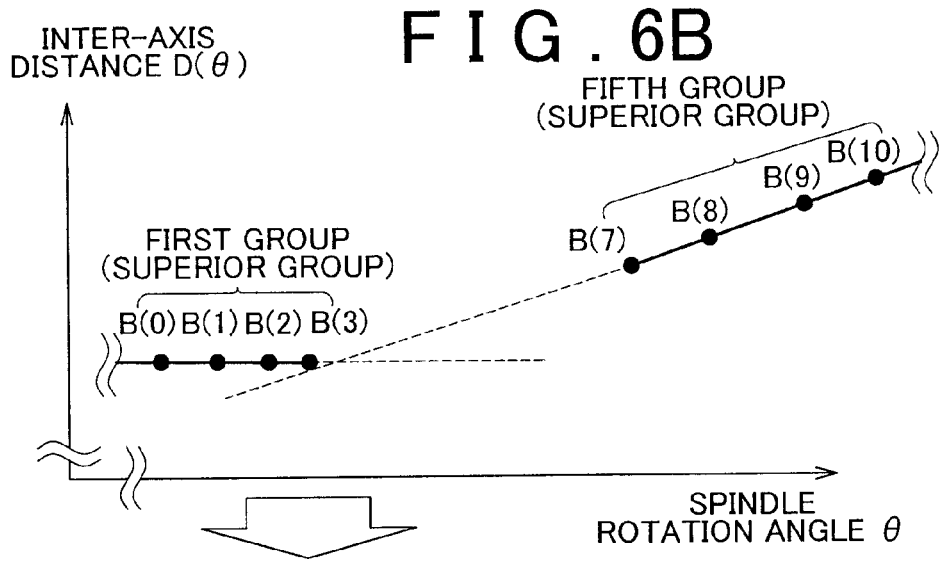
Figure 6C:
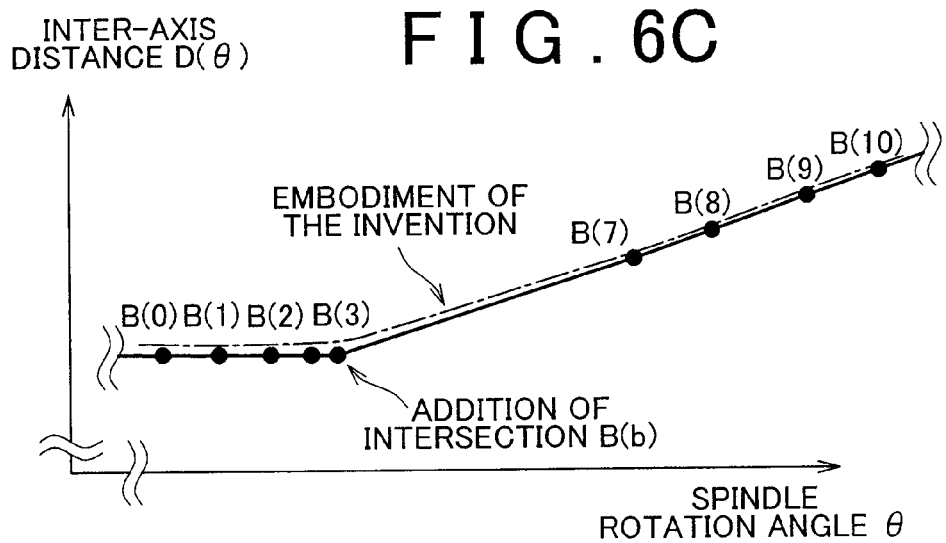

The main control unit 50 goes to S50 shown in FIG. 7, and goes back to S30. In S30, the main control unit 50 selects the next combination of the two groups that will be compared with each other, that is the combination of the fourth group (inferior group) and the fifth group (superior group). Because the combination of the fourth group and the fifth group is a combination of an inferior group and a superior group, the main control unit 50 executes the routine B in S200. As a result, the fourth group (inferior group) itself is deleted (profile points B(6) and B(7) that belong to the fourth group (inferior group) are deleted). However, the profile point B(7) that belongs to the fifth group (superior group) remains. The state shown in FIG. 6B is achieved by executing the process described so far. In this state, the main control unit 50 determines in S50 that two groups that should be compared with each other no longer remain (No), and goes to S60. In this case, if the two groups do not have overlapping ranges of the spindle rotation angle and the adjacent groups are apart from each other by a predetermined rotation angle or more, as shown in FIG. 6C, the intersection of the extension line of the line that connects the profile points in one of the groups to each other and the extension line of the line that connects the profile points in the other group to each other may be added as a new profile point (B(b) in the example in FIG. 6C). However, the intersection need not be added as a new profile point. FIG. 6C shows the example in which the intersection B(b) is added as a new profile point. Such an intersection may be added as a new profile point only when the combination of the two groups that are apart from each other is a combination of a superior group and a superior group. In S60, the main control unit 50 connects the profile points to each other with a smooth line as indicated by the dashed-dotted line in FIG. 6C, and sets profile points that are apart from each other at intervals of the spindle rotation angle θ of 2°. According to the existing technology, a step (step between the profile point B(5) and the profile point B(9)) is formed in the inter-axis distance D(θ), as indicated by the two-dot chain line in FIG. 6A. However, according to the method in the embodiment of the invention, such a step is not formed, and the line that connects the profile points to each other is smooth as indicated by the dashed-dotted line in FIG. 6C. Therefore, it is possible to further improve the processing accuracy.

The method of creating profile data used to process a non-circular workpiece is not limited to the routines described in the embodiment, and may be modified within the scope of the invention. In the embodiment of the invention, because the grinding machine that includes the rotating grinding wheel is described, the profile data is obtained based on the lift data and the radius of the grinding wheel (the radius of the grinding wheel is required because the position on the grinding wheel, at which the grinding wheel contacts the cam W changes). However, the invention may be applied to a lathe turning machine that includes a cutting bite. In this case, the radius of a grinding wheel is not required, and the profile data may be created based on the lift data (the radius is not required because the position of a cutting portion of the cutting bite, which contacts the cam W, does not change). The method for creating the profile data is as described in the embodiment of the invention. The structure of the machine tool 1 and the structure of the grinding machine 7 are not limited to those shown in FIGS. 1 and 2. The expressions "equal to or larger than ($\geqq$)" and "equal to or smaller than ($\leqq$)" may be replaced with the expressions "larger than (>)" and "smaller than (<)", respectively. Also, the expressions "larger than (>)" and "smaller than (<)" may be replaced with the expressions "equal to or larger than ($\geqq$)" and "equal to or smaller than ($\leqq$)", respectively. The numerals used in the description of the embodiment are just examples.

What is claimed is:

1. A method for creating profile data to process a non-circular workpiece, the profile data indicating a relationship between a spindle rotation angle and a tool reciprocation position, the spindle rotation angle being a rotation angle of a spindle that causes rotation of the non-circular workpiece about a rotation axis of the non-circular workpiece, when the non-circular workpiece is ground by a tool that reciprocates with respect to the non-circular workpiece in a direction which intersects with the rotation axis of the non-circular workpiece in synchronization with the rotation of the non-circular workpiece, the tool reciprocation position being a position of the tool in the direction which intersects with the rotation axis of the non-circular workpiece and corresponds to the spindle rotation angle, the method comprising:

reading lift data in which a lift amount is set based on a lift data rotation angle, the lift data rotation angle being a rotation angle of the non-circular workpiece when the non-circular workpiece is rotated about the rotation axis of the non-circular workpiece, in order to identify a shape of the non-circular workpiece;

calculating a profile point group formed of a plurality of profile points each of which indicates the tool reciprocation position that corresponds to the spindle rotation angle based on the read lift data;

dividing the calculated profile point group into a plurality of groups each of which is formed of profile points that are within a range of the spindle rotation angle up to a spindle rotation angle at which a manner in which the spindle rotation angle is changed is reversed;

selecting two groups, from among the plurality of groups, that satisfy a group comparison condition set in advance; and deleting the profile point that satisfies a specific point deletion condition which is set in advance for a combination of the selected two groups.

2. The method according to claim 1, wherein
the tool is a substantially cylindrical rotating grinding wheel,
the non-circular workpiece is ground at a cylinder face of the rotating grinding wheel,
a radius of the rotating grinding wheel is read in addition to the lift data, and
the profile point group is calculated based on the radius of the rotating grinding wheel in addition to the lift data.

3. The method according to claim 1, wherein the tool is a cutting bite.

4. The method according to claim 1, wherein the profile points are arranged in an order in which the lift data rotation angle is increased or in an order in which the lift data rotation angle is decreased.

5. The method according to claim 1, wherein the two groups that satisfy the group comparison condition are the two groups that have overlapping ranges of the spindle rotation angle.

6. The method according to claim 1, wherein in a case where each of the groups obtained by dividing the profile point group is classified as a superior group, in which the number of the profile points is equal to or larger than a predetermined value or of which a range of the spindle rotation angle is equal to or larger than a predetermined value, or an inferior group, in which the number of the profile points is smaller than the predetermined value or of which the range of the spindle rotation angle is smaller than the predetermined value, and a combination of the two groups that are selected based on the group comparison condition is a combination of a superior group and an inferior group, the profile point that satisfies the specific point deletion condition is the profile point that belongs to the inferior group and that is within the overlapping range of the spindle rotation angle.

7. The method according to claim 1, wherein in a case where each of the groups obtained by dividing the profile point group is classified as a superior group, in which the number of the profile points is equal to or larger than a predetermined value or of which a range of the spindle rotation angle is equal to or larger than a predetermined value, or an inferior group, in which the number of the profile points is smaller than the predetermined value or of which the range of the spindle rotation angle is smaller than the predetermined value, and a combination of the two groups that are selected based on the group comparison condition is a combination of an inferior group and an inferior group, the profile point that satisfies the specific point deletion condition is the profile point that belongs to the inferior group of which the range of the spindle rotation angle is smaller than the range of the spindle rotation angle of the other inferior group, and that is within the overlapping range of the spindle rotation angle.

8. The method according to claim 1, wherein in a case where each of the groups obtained by dividing the profile point group is classified as a superior group, in which the number of the profile points is equal to or larger than a predetermined value or of which a range of the spindle rotation angle is equal to or larger than a predetermined value, or an inferior group, in which the number of the profile points is smaller than the predetermined value or of which the range of the spindle rotation angle is smaller than the predetermined value, and a combination of the two groups that are selected based on the group comparison condition is a combination of a superior group and a superior group, the profile point that satisfies the specific point deletion condition is the profile point that is ahead of an intersection of a line that connects the profile points in one of the selected two groups to each other and a line that connects the profile points in the other of the selected two groups to each other, or ahead of an intersection of extension lines of the lines, and that is within the overlapping range of the spindle rotation angle.

9. The method according to claim 8, further comprising:
adding the intersection as a new profile point.

10. The method according to claim 9, further comprising:
connecting the profile points, which remain after the profile point that satisfies the specific point deletion condition is deleted, and the intersection to each other with a smooth line; and
setting new profile points that are apart from each other at intervals of a predetermined spindle rotation angle on the line.

11. The method according to claim 1, further comprising:
connecting the profile points, which remain after the profile point that satisfies the specific point deletion condition is deleted, to each other with a smooth line; and
setting new profile points that are apart from each other at intervals of a predetermined spindle rotation angle on the line.

12. A system for creating profile data to process a non-circular workpiece, the profile data indicating a relationship between a spindle rotation angle and a tool reciprocation position, the spindle rotation angle being a rotation angle of a spindle that causes rotation of the non-circular workpiece about a rotation axis of the non-circular workpiece, when the non-circular workpiece is ground by a tool that reciprocates with respect to the non-circular workpiece in a direction which intersects with the rotation axis of the non-circular workpiece in synchronization with the rotation of the non-circular workpiece, the tool reciprocation position being a position of the tool in the direction which intersects with the rotation axis of the non-circular workpiece and corresponds to the spindle rotation angle, the system comprising:
a data reading unit that reads lift data in which a lift amount is set based on a lift data rotation angle, the lift data rotation angle being a rotation angle of the non-circular workpiece when the non-circular workpiece is rotated about the rotation axis of the non-circular workpiece, in order to identify a shape of the non-circular workpiece;
a numerical control unit that
calculates a profile point group formed of a plurality of profile points each of which indicates the tool reciprocation position that corresponds to the spindle rotation angle based on the read lift data,
divides the calculated profile point group into a plurality of groups each of which is formed of profile points that are within a range of the spindle rotation angle up to a spindle rotation angle at which a manner in which the spindle rotation angle is changed is reversed,
selects two groups, from among the plurality of groups, that satisfy a group comparison condition set in advance, and
deletes the profile point that satisfies a specific point deletion condition which is set in advance for a combination of the selected two groups.

* * * * *